United States Patent [19]

Kunz et al.

[11] Patent Number: 5,155,162

[45] Date of Patent: Oct. 13, 1992

[54] IONOMERIC COATINGS

[75] Inventors: Barbara L. Kunz, Strongsville; Gary P. Craun, Berea, both of Ohio

[73] Assignee: The Glidden Company, Cleveland, Ohio

[21] Appl. No.: 684,811

[22] Filed: Apr. 15, 1991

Related U.S. Application Data

[62] Division of Ser. No. 397,280, Aug. 23, 1989, Pat. No. 5,036,134.

[51] Int. Cl.$^5$ ............................................. C08Z 33/06
[52] U.S. Cl. ................................. 524/560; 525/330.2
[58] Field of Search .................... 524/560; 525/330.2; 427/385.5

[56] References Cited

U.S. PATENT DOCUMENTS

| | | | |
|---|---|---|---|
| 3,264,272 | 8/1966 | Rees | 525/327.8 |
| 4,189,518 | 2/1980 | Peterson | 427/385.5 |
| 4,526,910 | 7/1985 | Das et al. | 524/560 |
| 4,537,926 | 8/1985 | Kivez et al. | 524/560 |

*Primary Examiner*—Joseph L. Schofer
*Assistant Examiner*—Jeffrey T. Smith
*Attorney, Agent, or Firm*—Thomas M. Schmitz

[57] ABSTRACT

Ionomeric paint coatings are produced from an ionomeric polymer containing carboxyl functionality which is coreacted or neutralized with an organic zinc salt. The ionomeric polymer coreacted with a zinc organic salt functions as a binder and exhibits thermosetting-like properties.

2 Claims, No Drawings

IONOMERIC COATINGS

This is a division of application Ser. No. 397,280 filed Aug. 23, 1989 now U.S. Pat. No. 5,036,134.

Protective or surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as a dispersant for the pigments, inerts, and other additives in wet coating compositions and further functions as a binder for the pigments and inert fillers in the cured or hardened paint film. Polymeric binders can be thermoplastic or thermosetting binders based on coreactive components such as a reactive functional polymer adapted to crosslink or coreact with a crosslinking component such as melamine or glycoluril.

Conventional thermosetting polymers often require high temperatures as well as external crosslinkers. Some crosslinkers, such as melamines in conventional industrial coatings or triglycidyl isocyanurate for powder coatings, can cause toxicity problems. Also, the release of volatile by-products, such as caprolactam, from some of these materials can cause film defects, such as cratering and bubbling.

It now has been found that excellent paint coatings can be produced based on an ionomeric polymeric binder comprising a carboxylic acid functional polymer coreacted or neutralized with an organic zinc salt such as zinc acetate, zinc propionate, or a similar organic zinc salt. The ionomer or ionic polymer was found to provide interreacting polymer chains which exhibit thermosetting properties comparable to coreactive polymeric binders crosslinked by an amino crosslinker. An ionomer can be defined as a polymer composed of a polymeric backbone containing a small amount of pendant carboxylic acid groups, usually less than 15 mole percent, which are neutralized partially or completely with organic zinc salts to form an ionomer. These ionic moieties and their interactions dominate the behavior of the polymer itself where it is believed that the zinc ions are exchanged for a hydrogen ion of the polymer carboxyl group. Ionic hydrocarbon polymers for elastomers or plastics are disclosed in U.S. Pat. No. 3,264,272. It now has been found that changes in the properties of polymeric binders for paint coatings can be achieved through the introduction of zinc metal ions by way of an organic zinc salt where modification of polymer properties is believed due to aggregation of ions described as ionic crosslinking. In this regard, the coreaction of two ion pairs on adjacent polymer chains results in a four-centered aggregate which behaves essentially like a crosslink. Among the dramatic effects that have been observed with paint compositions are increases in the moduli, increases in glass transition temperatures, and increases in viscosities. The formation of ionomeric clusters in protective surface coatings causes the carboxylic acid functional polymers to behave like a phase-separated block copolymer. The use of ionomers in powder coatings specifically is particularly advantageous since it allows control of the process such that the temperature during extrusion is lower than that of the volatilization temperature of the counterion (in the acid form). Thus, the ionomeric crosslinks are not formed until after processing of the powder coating, application to a substrate, melting of the powder, flow out and leveling to form a smooth continuous film. In this invention, the actual cluster formation takes place during the bake cycle which comprises temperatures higher than the temperature where the salt will lose its acidified counterion. Baking and curing conditions can be controlled so that the ionomer formation occurs during baking where temperatures are adjusted to that of the volatilization temperature of the acidified counterion. The ionomeric formations can be observed in non-aqueous solvent coatings or high solids coatings as well.

The unique properties of ionomers offer an alternate curing mechanism for solvent and high solids coatings generally and powder coatings especially, with potential for lower baking temperatures, less films defects, a unique balance of physical properties, less toxic curing chemistry, thermal reversibility and lower cost. Thus, the addition of low levels of ionic zinc groups to acid functional polymeric binders has been found to have dramatic effects on the physical properties of the polymeric binder. Incorporation of zinc organic salts, for instance, causes a thermoplastic acrylic to exhibit properties such as solvent resistance and hardness characteristic of a cured crosslinked paint film. Viscometry has also supported the formation of ionomeric domains in carboxylic acid functional systems, but with ionic crosslinking, these properties are thermally reversible. Useful carboxyl polymers characteristically exhibit low polarity, high hydrophobicity, and low hydrogen bonding characteristics. Zinc salts generally resist water or humidity and produce coatings which are not water sensitive. These and other advantages of this invention will become more apparent by referring to the detailed description and illustrative examples.

SUMMARY OF THE INVENTION

Briefly, the coating composition of this invention is based on a non-aqueous polymeric binder comprising a carboxylic acid functional polymer neutralized with an organic zinc salt to produce an ionomer which is adapted to gel and provide crosslink characteristics when heat cured as paint films. Preferred coating compositions comprise powder coatings. Carboxylic acid functional polymers contain at least 2% by weight ionizable carboxylic acid monomer. Neutralization by the organic zinc salt of at least 10% of the carboxylic acid groups is required to obtain the necessary ionomer formation. Suitable ionizable copolymers include acrylic copolymers, polyester polymers, polyester-acrylic graft polymers, and urethane polymers.

DETAILED DESCRIPTION OF THE INVENTION

The coating compositions of this invention are coatings based on an ionic polymeric binder comprising a non-aqueous carboxylic acid functional polymer at least partially neutralized with an organic zinc salt.

Referring first to the carboxylic acid functional polymers, useful polymers include acrylic copolymers, polyester-acrylic graft copolymers, polyester polymers and urethane polymers. It is believed that polarity and/or the hydrogen bonding capacity of the preferred useful polymers relates to their ability to form good ionomers. Polymers with low polarity and lower hydrogen bonding tendencies are generally hydrophobic. Ionic groups generally present in a hydrophobic environment have a greater tendency to associate in clusters or multiplets, thus avoiding the unfavorable hydrophobic environment. In each class of ionomeric polymers it is expected that the more hydrophobic polymers will form considerably improved ionomers.

Useful acrylic copolymers are carboxyl functional acrylic copolymers which can be produced by polymerizing monomers in bulk, in an organic solvent, or by other suitable processes to produce carboxylic functional polymer. The carboxylic acid functional acrylic copolymer comprises copolymerized ethylenically unsaturated monomers, including ionizable carboxyl monomers, to produce a copolymer containing reactive primary carboxylic acid groups and having a number average molecular weight between 500 and 100,000, and preferably between 1,000 and 40,000. Number average molecular weights are typically measured by GPC according to ASTM methods such as D3016-72; D3536-76; D3593-80; or D3016-78. The acrylic copolymers can be liquid at room temperature for solution coatings or high solids but are solid for powder paints. Polymers for powder coatings generally have a Tg between 20° C. and 100° C. as calculated by the Fox equation based on the weight ratio of specific monomers. The Acid No. of the carboxylic acid functional polymer is between 10 and 200 and preferably is between 30 and 90. The copolymers can be produced by bulk, solvent, or suspension polymerization of ethylenically unsaturated monomers including carboxylic acid monomers, activated by peroxide or azo or other free radical initiator at polymerization temperatures typically between 40° C. to 170° C. and preferably between 70° C. to 150°. Typically 0.2% to 5% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azobisisobutyronitrile and persulfate or ammonium persulfates. Molecular weight control can be achieved by adjusting temperature, initiator level, or by the addition of chain transfer agents, such as the common mercaptans.

Typical solvents useful in preparing the organic solvent-borne acrylic copolymers can include for instance, xylene, toluene, ethyl acetate, acetone, methylisobutyl ketone, methyl n-amyl ketone, methylisoamyl ketone, ethylamyl ketone, amyl acetate, methylethyl ketone, ethyl alcohol, mineral spirits, ethylene glycol monoethyl ether acetate, and other aliphatic, cycloaliphatic and aromatic hydrocarbons, esters, ethers, ketones and alcohols. After the polymerization is completed, the solvents may be stripped off to produce a solid polymer for use in a powder coating.

Copolymerizable ethylenically unsaturated monomers useful in producing the carboxylic acid functional acrylic copolymer are monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The carboxylic acid functional polymer comprises copolymerized monomers including at least 2% by weight ionizable carboxylic acid monomer which include acrylic and methacrylic acids as well as olefinic unsaturated acids. Acrylic acids include acrylic and methacrylic acid, ethacrylic acid, alpha-chloracrylic acids, alpha-cyanoacrylic acid, crotonic acid, and beta-acryloxy propionic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydromuconic acid. On a weight basis, the carboxylic acid functional polymer contains at least 2% copolymerized carboxyl functional monomers and preferably between 5% and 15% carboxylic acid monomers. The most preferred carboxylic acid monomers are acrylic acid and methacrylic acid and such acid monomers preferably comprise on a weight basis between 5% and 15% of the copolymerized monomers in the carboxyl functional polymer. Preferred carboxyl polymers comprise copolymerized monomers on a weight basis between 0% and 95% acrylic or methacrylic monomer, between 5% and 15% acrylic or methacrylic acid, with the balance being other ethylenically unsaturated monomers. Carboxylic acid functional polymers preferably are produced in bulk or in solvent, although suspension polymerization can be used for producing powder paint compositions.

A further preferred aspect of this invention is directed to a carboxyl functional polymer comprising a polyester polymer. Polyester polymers comprise the esterification products of glycols, diols, or polyols with excess equivalents of dicarboxylic acid or polycarboxylic acids. Linear aliphatic glycols are esterified with greater molar amounts of aromatic dicarboxylic acid and/or linear saturated dicarboxylic acid having between 2 and 36 linear carbon atoms such as adipic, azelaic, succinic, glutaric, pimelic, suberic or sebacic acid to produce low molecular weight polyesters. Preferred and commercially available linear saturated dicarboxylic acids are dodecanedioic acid, dimer fatty acids, or azelaic acid. Aromatic dicarboxylic acids (anhydrides) include phthalic, isophthalic, terephthalic, and tetrahydrophthalic. Minor amounts of polyfunctional acids such as trimelletic acids can be added. Suitable glycols include linear aliphatic glycols having 2 to 16 carbon atoms such as 1,3- or 1,4-butylene glycol, 1,6-hexane diol, neopentyl glycol, propylene glycol, ethylene glycol and diethylene glycol, propylene, and dipropylene glycol, and similar linear glycols. Preferred glycols are hydrophobic glycols such as hydrogenated Bisphenol A neopentyl glycol and 1,6-hexane diol. Minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1% and 50% and preferably between about 5% and 20%. Hence, the polyester contains considerable excess unreacted carboxylic groups to provide a carboxyl polyester having an Acid No. between 5 and 300 and preferably between 20 and 100. The molecular weight of useful polyester polymers are between 500 and 50,000 and preferably between 1,000 and 10,000. Glycol can be esterified with minor amounts of up to about 20% by weight of unsaturated dicarboxylic acids (anhydrides) including maleic, fumaric or itaconic acids; or monocarboxylic acids such as acetic, benzoic, and higher chain aliphatic acids up to about 12 carbon atoms as well as aromatic acids. The polyester component can be produced by solvent or bulk polymerization although bulk polymerization is preferred. The raw materials can be charged in bulk and esterification polymerized at temperatures typically between 170° C. to 240° C. although moderately higher or lower temperatures can be utilized satisfactorily. Azeotropic removal of water with a suitable solvent, such as xylene, often helps to reduce processing times. An esterification catalyst can be used, typically at less than 1% levels based on charge, such as an organic tin compound.

A further preferred embodiment of this invention is directed to a carboxyl functional polymer comprising a polyester-acrylic graft polymer. Grafted copolymers of polyester and acrylics can be produced by free-radical polymerization of ethylenically unsaturated monomers, including acrylic and carboxyl monomers, in the presence of a preformed molten or fluid polyester at temperatures sufficient to induce addition copolymerization of the monomers along with some grafting onto the polyester backbone. Organic solvents are not required, but can be added if desired to provide desired viscosity in subsesolvent coatings. On a weight basis, the polyester-acrylic graft polymer contains between 5% and 90%, and preferably between 10% and 40% polyester polymer component with balance being the acrylic polymer component. The polyester component of the polyester acrylic graft polymer is a moderate molecular weight polymer having a number average molecular weight between about 500 and 50,000 and preferably between 1,000 and 5,000. The polyester polymer should have an Acid No. above about 5, preferably between 20 and 100, and can be prepared as previously described.

The acrylic polymer component of the polyester-acrylic graft polymer comprises in-situ copolymerized ethylenically unsaturated monomers, including acrylic monomers and carboxyl monomers, along with other ethylenically unsaturated monomers if desired. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloroacrylic acid, alpha-cycanoacrylic acid, crotonic acid, beta-acryloxy propionic acid, and beta-styrl acrylic acid. Other ethylenically unsaturated monomers have been previously described herein. The copolymerized monomers for the acrylic component of the polyester-acrylic graft polymer comprises copolymerized monomers, on a weight basis between 1% and 100% acrylic monomer, between 0% and 30% acrylic or methacrylic carboxylic acid monomer, with the balance being other ethylenically unsaturated monomers. Preferred acrylic components comprise between 20% and 90% acrylic monomer, between 5% and 15% carboxyl acid monomer, with the balance being other ethylenically unsaturated monomers. It should be noted that the carboxyl functionality can be part of the polyester polymer or part of the grafted acrylic polymer or on both polymers. The Acid No. of the polyester-acrylic graft polymer is preferably between about 20 and 100. The polyester-acrylic graft polymer preferably comprises by weight between 5% and 90% polyester polymer component and between 10% and 95% acrylic polymer component. The number average molecular weight of the polyester-acrylic graft polymer is between about 2,000 and 100,000 while preferred molecular weights are between 5,000 and 50,000 as measured by GPC. GPC chromatograms of the polyester and the grafted polyester-acrylic indicated that good grafting efficiency can be obtained.

Grafted copolymers of polyesters and acrylics for powder coatings are prepared by polymerizing acrylic monomers in melted polyester to produce a product having good powder resin properties such as good tack, processability, grinding and application properties. Solvent coatings can be prepared in solvent or subsequently dissolved in solvents. When cured, films of the grafted polyester-acrylic had no evidence of incompatibility, but did exhibit good solvent resistance, excellent flexibility on a conical mandrel, and excellent impact resistance. An added advantage to this process is the simplicity in processing on large scale, where the polyester can be prepared in a reactor, and then acrylic monomers can be added immediately to form the grafted polymer. For preparation of powder paints, no solvent is required and thus stripping is not necessary. Highly desirably cured paint films were produce with good results by the ionomeric curing process of this invention which exhibited excellent flexibility along with highly desired solvent resistance, water resistance, hardness, and impact resistance.

In accordance with a further preferred embodiment of this invention, a carboxyl functional polymer comprising a urethane ionomer provides an excellent ionomer polymer useful as a binder in coatings and particularly paint coatings. Urethane ionomers can be produced with terminal carboxyl groups as well as terminal blocks, which can be crosslinked by zinc organic salts upon heating in accordance with this invention. Improved physical properties of cured paint films, particularly cured powder paint films or solution applied paint films, are readily evident. Urethane ionomers provide a special set of advantages to coatings: weatherability, better flexibility, wide latitude in polymer structure, control in synthesis, allowing positioning of flexible units along the backbone, and position of acid groups at the end or in the middle of the urethane polymer chain. Urethane ionomeric powder coatings provide high quality coatings with a good overall balance of properties.

Carboxyl functional urethanes can be produced by coreacting diisocyanates with a diol or a polyol and a hydroxyl acid. Linear polyurethanes are obtained from difunctional reactants while branched polyurethanes are produced from the combination of difunctional and higher functional reactants. Urethanes for ionomeric crosslinking in coatings can be prepared from any of several available aromatic, aliphatic, and cycloaliphatic diisocyanates and polyisocyanates. Suitable polyisocyanates can be di- or triisocyanates such as for example 2,4- and 2,6-tolylene diisocyanates, phenylene diisocyanate; hexamethylene or tetramethylene diisocyanates, 1,5-naphthalene diisocyanate, ethylene or propylene diisocyanates, trimethylene or triphenyl or triphenylsulfone triisocyanate, and similar di- or triisocyanates or mixtures thereof. The polyisocyanate can be generally selected from the group of aliphatic, cyclo-aliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-toluene diisocyanate, 2,6-toluene diisocyanate and mixtures thereof, polymethylene polyphenyl polyisocyanate, or isocyanate functional prepolymers. Preferred diisocyanates include isophorone diisocyanate, hexamethylene diisocyanate, toluene diisocyanate and the like.

A wide variety of diols and polyols can be used to prepare urethanes with a wide range of properties. Polyethers, such as the polytetramethylene oxides can be used to impart flexibility as well as the polyethylene oxides and polypropylene oxides. Simple diols that can be used include neopentyl glycol, 1,6-hexane diol, and longer chain diols having 12, 14 and higher carbon chains. Branching can be introduced with polyols such as trimethylol propane and pentaerythritol. Hydroxyl functional polyesters and various other hydroxyl functional polymers are also suitable. Useful polyols preferably contain two, three, or four hydroxyl groups for coreaction with the free isocyanate groups. Useful polyols are: -diols such as ethylene glycol, propylene glycols, butylene glycols, neopentyl glycol, 14-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; and hydroxyl terminated polyesters.

The polyurethane copolymer of this invention further contains a coreacted hydroxy-acid material. The hydroxy-acid contains at least one reactive hydroxy group for coreacting with the isocyanate during polymer synthesis and at least one carboxy group which is essentially non-reactive to the isocyanate groups during the polymer synthesis. The hydroxy-acid can be represented by the general formula:

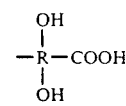

or HO—R—COOH where R is alkyl of 1 to 20 carbon atoms or aromatic or alkyl-aromatic. Examples of alkyl acids are 2,2-dihydroxymethyl propionic acid, 2,2-dihydroxymethyl butyric acid, glycolic acid, and the like; other acids are lactic acid, 12-hydroxy stearic acid, the product of the Diels-Alder addition of sorbic acid to di-(2-hydroxyethyl) maleate or fumarate, or low molecular weight (300 to 600) precondensates of polyols with tribasic acids such as trimelletic anhydride or Ricinoleic acid. Acid functionality can be introduced with materials like 12-hydroxystearate, dimethylolpropionic acid, and various other hydroxy acids as well as carboxylated polyesters such as the Niax PWB-1200 (Union Carbide). Monohydroxyl acids will place the acid functionality at the end of the chain, while the diol acids will randomly place the acid groups in the chain. When isocyanates are reacted with diols and polyols of various types, the reaction rate may be enhanced by the use of catalysts. Common isocyanate catalysts are suitable and examples include dibutyltindilaurate, dibutyltinoxide, and the like.

Urethane resins should be synthesized with an Acid No. between 10 and 200. On a weight basis, the polyurethane comprises between 5% and 70% diisocyanate, between 20% and 90% diol or polyol, with the balance being hydroxy-acid. On an equivalent basis, the urethane comprises between 0.5 and 2.0 equivalents diisocyanate, between 0.5 and 2.0 equivalents of diol or polyol, and between 0.1 and 1.0 equivalents hydroxyl-acid. The number average molecular weight of the urethane can be between 500 and 100,000 and preferably between 5,000 and 50,000 as measured by GPC. Urethane resins for powder coatings should be synthesized with a tack temperature of about 20° C. to 120° C. for good handling as a powder coating. Viscosity of the film remains low to allow good flow and leveling, and then the evolution of the volatile anion of the metal salt allows ionic crosslinking to occur. For solvent or high solids coatings, urethanes can be produced in solvent or subsequently dissolved in solvent.

Referring next to the ionizable organic zinc salt useful for converting carboxyl polymers into ionomers, the counterion of the zinc salt, in its protonated form, characteristically has a pka (dissociation constant in water) above about 3.0, depending on the temperature of reaction. The zinc salt organic counterion in its protonated form should volatilize in the curing temperature range to combine the carboxylic acid functional polymer with the zinc salt. Similarly, the preferred pka of the protonated organic counterion of the zinc salt should be greater than or approximately equal to about the pka of the carboxylic acid in the carboxyl copolymer, that is, the carboxylic acid in the copolymer should be a stronger acid. It is believed that when the acid in the carboxyl copolymer is substantially weaker, the polymer carboxyl group will essentially remain in its protonated form. Conversely, when the acid in the copolymer is the stronger acid, its proton will be loosely held and will be readily available to react with the zinc ion. For example, preferred acrylic copolymer compositions containing copolymerized methacrylic acid, require zinc organic salts which have an appropriate pka to allow significant ionic interaction with the organic zinc salt and provide crosslinking type polymeric properties in accordance with this invention. Thus, acids weaker than methacrylic acid and having a higher pka than methacrylic acid provide the desired ionic interaction between ionic polymer chains to provide crosslink type (ionic crosslink) cured polymer structures. Accordingly, useful zinc organic salts include for example those compounds listed in the following Table A.

TABLE A

| Salt | *M.P. (°C.) | *B.P. (°C) Protonated Counterion | *pKa (Protonated Counterion) |
|---|---|---|---|
| Zn Propionate | 185 | 141 | 4.87 |
| Zn Pentanoate | 100 | 186 | 4.84 |
| Zn Butyrate | >200 | 163 | 4.82 |
| Zn Hexanoate | >200 | 206 | 4.85 |
| Zn Stearate | 120 | 358 | 4.08, 9.85 |
| Zn Salicylate | >200 | 211 | 4.06, 9.92 |
| Zn Pivalate | >200 | 164 | 5.03 |
| Zn Heptanoate | >200 | 223 | 4.89 |
| Zn Saccharate | >200 | 125 | 5.00 |
| Zn Octanoate | 143 | 239.3 | 4.90 |
| Zn Benzoate | >200 | 249 | 4.20 |
| Zn Acetate | 237 | 116 | 4.76 |
| Zn Laurate | 128 | 131 | 4.89 |
| Zn Butenoate | >200 | 185 | 4.68 |
| Zn Ascorbate | >200 | 190 | 4.10, 11.80 |
| Zn Cyclohexylacetate | >200 | 243 | 4.51 |
| Zn Decanoate | >200 | 270 | 4.95 |

*Lange's Handbook of Chemistry

Melting points measured by using Fisher M.P. Apparatus.

Preferred useful organic zinc salts include zinc acetate, zinc propionate, zinc butyrate, zinc pentanoate, zinc hexanoate, and the like.

Useful zinc organic salts having the desirable ionic characteristics for neutralizing carboxylic acid acrylic binders have protonated counterions which exhibit pKa's above about 3.0 and preferably above 3.8 and boiling points above about 80° C. for use in powder coatings to enable the zinc to interact with the carboxyl polymer and the protonated organic salt to volatilize largely during the heat curing steps.

In accordance with this invention, the useful level of neutralization of the carboxylic acid functional copolymer, based on the equivalent of zinc salt added per equivalent of available carboxylic acid functionality in the copolymer, is above 10% and preferably between 30% and 200% and most preferably between 50% and 150% neutralization.

In accordance with this invention, the ionomeric binder is useful in powder and solvent-borne coatings to provide ionomer, thermoset-like properties to a heat cured paint film. By properly balancing the hydrophobicity and polarity of the ionomeric polymers of this invention, thermoset crosslinked type properties can be achieved upon heating to induce the desired ionomeric clustering in accordance with this invention. Suitable processing temperatures for the ionomer must minimize the amount of ionomeric interactions or clustering during the melt-mixing step of the powder paint which, ordinarily, dictates mixing at temperatures slightly above the tack temperature of the carboxylic acid polymer but less than the volatilization temperature of the acidified counterion of the zinc organic salt. Thus, thermal curing of the powder paint can be readily achieved during the curing cycle without premature gellation of the powder coating. Resulting paint film integrity properties resemble crosslinked polymer networks and exhibit high film hardness as well as considerable resistance to solvent and water. Zinc organic salts useful in powder coatings preferably are solid at ambient temperatures (25° C.) with a melting point less than the intended curing temperatures or the salt must be soluble in the acid polymer. The organic counterion of the zinc salt in its protonated form preferably volatilizes during the intended curing cycle. Preferred curing temperatures are above 120° C. and preferably between 150° C. and 200° C.

Cured paint films produced in accordance with this invention provide ionomeric interactions or clustering between ionomer polymer chains in a crosslink type fashion to produced cured paint films exhibiting considerable MEK resistance, water resistance, improved hardness, and other film integrity properties.

The merits of this invention are further illustrated in the following examples.

EXAMPLE 1

The following is a general procedure for preparing powder paint samples and testing the same as applied coatings.

a) Synthesis of Styrene/Acrylate Copolymers

Synthesis of an acrylate copolymer is given as an example of a typical experimental procedure. Weigh out the following raw materials:

a)
Xylene—670 g
b)
MAA—200 g
BMA—1200 g
Styrene—600 g
t-Butyl perbenzoate—20 g
c)
t-Butyl perbenzoate—2 g Equipment: 4 neck, 5 liter flask; metal paddle stirrer; stir bearing; thermometer; nitrogen inlet; condenser; Dean Stark trap.

Bring (a) to reflux under a nitrogen purge at approximately 140° C. while collecting condensed water in a trap. Pump in (b) over 3 hours at 140° C., hold for 30 minutes, add (c), and hold for 30 minutes. Remove the nitrogen and replace it with a vacuum gauge. Move the condenser from the reflux to the distillation setup with appropriate fittings and a one liter collection vessel. Strip off the xylene by raising the temperature to 170° C., and then applying first an aspirator vacuum, and then a good pump vacuum. Pour the hot resin from the flask into a can.

b) Preparation of Powder Paint Ionomer Samples

Stoichiometric quantities of copolymer, zinc organic salt, and other additives were weighed out and placed into a stainless steel Vita-Mix Model 3600 blender. The sample chunks were broken by pulsing the Vita-Mix until the larger pieces were crushed. The samples were pulverized by grinding at high speed for 15 seconds in the forward mode and 15 seconds in the reverse mode. The powdered material was placed in polyethylene bags.

The powdered pre-mixed samples were melt-mixed using a Brabender two roll, water cooled mill. The mill was set to the appropriate melting temperature of the materials to be mixed and turned on in the forward mode. The powdered samples were sprinkled slowly over the hot roll and allowed to melt and mix by adjusting the spacing at the nip. When the entire sample was on the mill, the speed was adjusted to the highest setting. The sample was mixed for three minutes, with scraping and remixing every one minute. The molten sheet of resin was scraped from the mill and cooled to room temperature. The melt-mixed samples were broken into flakes by using a rubber mallet or the Vita-Mix blender. These flakes were fed into a Brinkman or Tecator grinder using a vibratory bed and a 0.5 micron screen at low speed. When the entire sample was ground, it was removed from the grinder and was sieved through a 120 mesh brass or stainless steel screen using a sieve shaker.

c) Panel Preparation

The prepared powder paint samples were collected and electrostatically sprayed over cold rolled steel at a film thickness of approximately 1.5 to 2.0 mils. The steel panels were baked at an appropriate baking temperature, cooled and evaluated for film performance.

d) Isopropanol Extractions

Films were cast in triplicate onto pre-weighed, desiccated aluminum foil panels measuring two inches by four inches. The films were cured for 20 minutes at 400° F., cooled to ambient temperature, desiccated for 24 hours, reweighed, then submerged in isopropanol for 68 hours at ambient temperature. The soaked panels were removed from the isopropanol bath, dried at 250° F. for 10 minutes, desiccated for 24 hours, then reweighed. A percentage weight loss was calculated.

The polymer prepared as described in Example 1, part A, was evaluated for coating properties as shown in Table 1. Neutralization was done by addition of stoichiometric quantities of zinc acetate.

TABLE 1

| | Film Properties of Ionomeric Coatings | | | |
|---|---|---|---|---|
| % Neut. | 0 | 50 | 100 | 150 |
| Gel Time (sec.) | >240 | 77 | 31 | immediately |
| MEK Resistance (# double rubs to substrate) | 13 | 48 | 87 | >100 |
| Pencil Hardness | 2B | 2B | B | B |

A styrene/acrylic polymer was solution polymerized in xylene using 50% butyl methacrylate, 30% styrene, 10% butyl acrylate, and 10% methacrylic acid at levels calculated to give a Fox Tg of 40° C. The initiator was t-butyl perbenzoate. Vacuum stripping was used to remove the xylene from the finished polymer solution. The resultant material was premixed with various levels of zinc acetate using a Vita-mix high speed blender. The powder sample was melt mixed at 110° C. on a Beabender two-roll mill, and pulverized using a Brinkman grinder. The sample was sieved through a 120 mesh brass screen. The prepared powder coating was applied to Parker Bonderite 1000 via electrostatic spray, and the panels were baked at 350° F for 20 minutes.

The ICI Cone and Plate viscometer was used to measure molten viscosities of the samples at 175° C over time. The results showed an increase in viscosity with time for all neutralized samples, and more dramatic rises in viscosity as the level of neutralization is increased, as shown in Table 2. This data supports the formation of ionomeric clusters in the neutralized films.

TABLE 2

| | Influence of Ionomer Formation on Melt Viscosity (poise) | | | | | |
|---|---|---|---|---|---|---|
| % Neut. | 0 | 20 | 40 | 60 | 80 | 100 |
| Time 0 | 77.5 | 112.5 | 125.0 | 162.5 | 210.0 | 225.0 |
| 60 | 67.5 | 105.0 | 130.0 | 222.5 | 492.5 | 372.5 |
| 120 | 65.0 | 110.0 | 155.0 | 280.0 | 607.5 | 512.5 |
| 180 | 67.5 | 117.5 | 170.0 | 322.5 | 662.5 | 875.0 |
| 240 | 67.5 | 120.0 | 180.0 | 367.5 | Gel | Gel |
| 300 | 67.5 | 122.5 | 187.5 | 430.0 | Gel | Gel |

Gel time was measured on the samples prepared, and a linear relationship exists between gel time and level of neutralization, as shown in Table 3. This finding also supports the formation of ionomeric domains with increasing neutralization.

TABLE 3

| % Neutralization | Gel Time (Seconds) |
|---|---|
| 0% | >240 |
| 20% | 240 |
| 40% | 184 |
| 60% | 140 |
| 80% | 78 |
| 100% | 52 |

EXAMPLE 3

Ionomeric cluster formation has also been shown to translate in cured film properties such as MEK resistance and pencil hardness. In this regard, two acrylic resins were evaluated for film performance after a 20 minute bake at 350° F. with the results shown in Table 2.

TABLE 4

| Effect of Neutralization on Film Properties | | |
|---|---|---|
| | MEK Resistance | Eagle Hardness |
| Acrylic A (Ex. 1) | | |
| Unneutralized | 12.5 | 2B |
| 50% neutralized | 47.5 | 2B |
| 100% neutralized | 88.0 | B |
| 150% neutralized | >100.0 | B |
| Acrylic B (Ex. 2) | | |
| Unneutralized | 17.5 | HB |
| 50% neutralized | 75.0 | HB |
| 100% neutralized | >100.0 | F |
| 150% neutralized | >100.0 | F |

EXAMPLE 4

Through the study of various organometallics, it has been found that characteristics represented by certain preferred zinc organic salts exist for the particular salt to be effective in forming ionomeric domains. The salt must have a melting point within the temperature range used for processing these materials or have some solubility in the polymer in order to intimately mix the polymer and salt sample. Secondly, the counterion in its acid form must volatilize off during the baking cycle (below 400° F.) to drive the equilibrium reaction between polymer anion (—COO—) and cation from the salt ($Zn++$) to completion. This volatilization temperature must not be so low, however, to cause the reaction to proceed to completion during the processing stages (above 150° C.). Thirdly, the -log of the dissociation constant for the acid counterion must be higher than about 3.0, depending on the temperature of reaction. The acid counterion must be a weaker acid allowing the methacrylic acid or acrylic acid to be the more loosely dissociated so that proton transfer will take place. Data in support of this is shown in Table 5.

TABLE 5

Influence on pKa on Film Properties

| | | Neutralization: | | | | |
|---|---|---|---|---|---|---|
| | | MEK Resistance | | | Eagle Hardness | |
| Salt | pKa | 0% | 50% | 100% | 0% | 50% | 100% |
| Zinc acetate | 4.76 | 12.5 | 47.5 | 88.0 | 2B | 2B | B |
| Zinc lactate | 3.86 | 18.0 | 20.0 | 21.0 | 2B | 2B | 2B |

ICI Cone and Plate viscometer data also supports the lack of ionomeric clusters in the zinc lactate neutralized samples as shown in Table 6.

TABLE 6

Viscosity (poise) w/Zinc Salt Neutralization

| Zinc Salt | Acetate | | Lactate | |
|---|---|---|---|---|
| % Neut. | 0 | 100 | 0 | 100 |
| Polymer | Example B | | Example A | |
| Time (sec.) | | | | |
| 0 | 70.0 | 412.5 | 695.0 | 685.0 |
| 60 | 67.5 | 570.0 | 652.0 | 652.5 |
| 120 | 70.0 | 647.5 | 660.0 | 640.0 |
| 180 | 65.0 | 712.5 | 657.5 | 647.5 |
| 240 | 62.5 | 785.0 | 647.5 | 650.0 |
| 300 | 60.0 | 847.0 | 647.5 | 652.5 |

EXAMPLE 5

Polyesters

Commercially available acid functional polyester resins were obtained from DSM and were evaluated for their ability to form ionomers with zinc acetate neutralization. Both viscometry and film properties indicate the formation of ionomers.

TABLE 7

| Neut Visc. | | 0 | 50 | 100 | 150 | 0 | 50 | 100 | 150 |
|---|---|---|---|---|---|---|---|---|---|
| Polyester (DSM) | | | P2998 | | | | P2065 | | |
| Acid No. | | | 82.5 | | | | 85.0 | | |
| Time | 60" | 72.5 | 92.5 | 85.0 | 427.5 | 112.0 | 122.5 | 128.5 | 180.0 |
| | 120" | 65.0 | 102.5 | 87.5 | 695.0 | 114.5 | 120.0 | 120.0 | 200.5 |
| | 180" | 65.0 | 102.5 | 105.0 | 1150.0 | 112.5 | 122.5 | 130.0 | 210.0 |
| | 240" | 62.5 | 110.0 | 117.5 | Gel | 110.0 | 128.5 | 142.5 | 212.0 |
| | 300" | 60.0 | 112.5 | 122.5 | Gel | 112.5 | 140.0 | 158.0 | 222.5 |
| MEK Resin | | 10 | 10 | 30 | >100 | 5 | 10 | 20 | 55 |
| Pencil H. | | 2B | B | F | F | 2B | 2B | B | B |

EXAMPLE 6

Polyester-Acrylic Graft Polymer

A grafted copolymer of a polyester and an acrylic was prepared by polymerizing acrylic monomers in the melted polyester along with peroxide catalyst.

a) Polyester: A polyester was prepared by esterifying dodecanedioic acid with 1,6-hexanediol. The resulting polyester had an equivalent weight of 1170 per carboxylic acid, was a crystalline solid at 20°, and melts at 70° C.

b) Graft copolymer: a 40% by weight polyester and 60% acrylic graft copolymerizing monomers comprising 55% butylmethacrylate, 30% styrene, 5% butyl acrylate, 10% methacrylic acid monomer mix with 3% benzoyl peroxide (BPO) at 140° C. over 3 hours. The resulting polyester-acrylic graft had 145° F. tack temperature, 10 poise cone-and-plate viscosity at 175° C.

II. Polyester-Acrylic Graft Polymer

The same composition was produced as indicated in I of this Example, except 1% tertiary-butylperbenzoate was used as the peroxide initiator for the monomers.

III. Acrylic Copolymer Only

For comparison, an acrylic copolymer of the same monomers indicated in I was produced. The monomers were copolymerized in 30% xylene based on the weight of the monomers with 1% t-butyl perbenzoate. No polyester was present.

IV. Test Results

Powder coatings were produced from the foregoing polymers, I, II, and III and neutralized with zinc propionate. Test results on heat cured films were tested with the results shown in the following Table.

TABLE 8

| Resin | % Neutralization With Zn Propionate | MEK Resistance | Reverse Impact | Mandrel | Penc. Hard. |
|---|---|---|---|---|---|
| III | 0% | 10 rubs | <10 | fail | 2B |
| | 100% | 93 rubs | <10 | fail | B |
| I(a) + III | 100% | 22 rubs | >80 | pass | 6B |
| II. t-BP | 0 | 3 rubs | <5 | fail | <6B |
| | 100% | 43 rubs | >80 | pass | 6B |
| I. BPO | 0 | 3 rubs | <5 | fail | <6B |
| | 100% | 39 rubs | >80 | pass | 6B |

I(a)+III was a simple 40/60 melt mix of the polyester and the acrylic. Unneutralized controls had no Zn propionate added while the 100% samples had equal equivalents of Zn propionate to carboxylic acid in the resin counting Zn as difunctional. MEK rubs are rubs to break through the film to the substrate. Impacts were measured in the reverse mode giving the values as listed in inch pounds of impact with a ½ inch dart. Failed mandrel bends had cracks the entire length of the mandrel, while pass panels had no cracking down to a 1/8 inch bend.

EXAMPLE 7

1. Urethane

Combine the following:
1000 g—polytetramethylenoxide, 1000 mw (BASF)
444 g—isophorone diisocyanate
2 g—dibutyltindilaurate
600 g—12-hydroxystearic acid
1000 g—methylethylketone, MEK Warm the solution to about 40° C. and allow the reaction exotherm to carry the temperature to about 85° C. Hold 3 hours, strip off the MEK, cook, and break up the resin.

2 Powder Paint

Dry blend the following:
100 g—urethane resin from 1
5.0 g—zinc propionate
0.5 g—benzoin
2.0 g—Modiflow PL-200

Mix for 3 minutes on a two roll mill at 110° C., remove, flake, mill, seive using 120 mesh screen, electrostatically apply to Bonderite 1000 panels, and bake at 400° F. for 20 minutes.

TABLE 9

| Urethane Ionomer Film Property | | |
|---|---|---|
| % Neut. | 0 | 100 |
| Knoop Hardness Number | 2.89 | 4.53 |
| MEK Resistance | 28.0 | 52.0 |

EXAMPLE 8

Synthesis of Acrylic Solution Polymers a)
670 g xylene
b)
1100 g butyl methacrylate
200 g methacrylic acid
600 g styrene
100 g butyl acrylate
20 g t-butyl perbenzoate Heat (a) to reflux in a 5 l flask uner $N_2$ blanket. Add (b) over 3 hours, hold 15 minutes, add 2 g t-butyl perbenzoate, hold 15 minutes. Heat to 170° C. and collect xylene. Strip remaining xylene at 120° C. with vacuum, cool.

Samples of 50% NV were prepared in MEK at 0 and 100% neutralization. Cure was achieved over Bonderite 1,000 after 30 minutes at 400° F.

| | MEK Double Rubs |
|---|---|
| Acrylic | 7 |
| Acrylic + Zn propionate | 71 |
| Acrylic + Zn acetate | 35 |

EXAMPLE 9

Carboxyl functional polyesters were prepared as follows:

| | 42A | 43A | 43B | 43C |
|---|---|---|---|---|
| Empol 1018 | 282 | — | — | — |
| Empol 1010 | — | 598 | — | — |
| Isophthalic acid | 41.5 | — | — | — |
| Hydrogenated bisphenol A | 120.2 | 100 | 322.6 | — |
| butyl stanoic acid | 0.1 | 0.2 | 0.2 | 0.2 |
| trimethylol propane | — | 28 | 36 | 34.5 |
| azelaic acid | — | — | 404.1 | 537.5 |
| neopentyl glycol | — | — | — | 216.4 |
| Methyl ethyl ketone (MEK) | — | 300 | 300 | 300 |

Blend reactants in a 1 liter flask under $N_2$ blanket. Heat with good stirring to 200° C., collect water. Slowly raise temperature to 230° C. over about 5 hours. Use 10-20 ml xylene to azeotrophe off water in 42A, 43A, B. Use a column packed with glass beads for 43C to keep neopentyl glycol in the flask. Cool. Add MEK. Add 182 g xylene to 42A.

Polyester Solutions

Solutions were prepared as 40% N.V. solutions in xylene or MEK at 0, 50, and 100% N.V. Films were drawn down over B-1000 and baked for 20 minutes at 400° F. MEK resistance is shown in Table 10.

TABLE 10

| Evaluation of Carboxy-Polyesters as Ionomers MEK Resistance | | | |
|---|---|---|---|
| % Neutralization | 0 | 50 | 100 |
| Polyester Type | | | |
| Linear IPA/DFA/HBPA (xylene) | 15 | 27 | 29 |
| Branched DFA/HBPA (MEK) | 6 | 7 | 30 |
| Branched Azelaic/HBPA (MEK) | 7 | 8 | 27 |
| Branched Azelaic/NPG (MEK) | 4 | 4 | 13 |

EXAMPLE 10

A urethane was prepared as follows:
250 g—poly(tetrahydrofuran), 1000 (BASF)
83.8 g—dimethylol propionic acid, DMPA
167 g—isophorone diisocyanate
250 g—methylethyl ketone
0.5 g—dibutyltindilaurate Mix and slowly heat to reflux (over ½ hour). Hold at reflux for 4 hours (DMPA is gone in about 2 hours). Cool.

A urethane solution was prepared as a 40% solution in MEK at 0, 50, and 100% neutralization. Film properties were measured over Bonderite 1000 after 20 minutes at 400° F. bake. See Table 12.

TABLE 11

| Evaluation of Flexible Carboxy-Urethane | | | |
|---|---|---|---|
| % Neutralization | 0 | 50 | 100 |
| Film Thickness (mils) | 2.2 | 2.2 | 2.0 |
| MEK Resistance | 77 | 115 | 159 |
| DI Resistance | >200 | >200 | >200 |
| 60° Gloss | 79.6 | 45.2 | 33.6 |
| Impact (in. lbs.) | | | |
| Direct | 60 | >160 | >160 |
| Reverse | 20 | 130 | >160 |
| (20' @ 400° F.) | | | |

EXAMPLE 11

Examples of Other Zinc Salts

Powder

Acrylic used was from Example 2. Zionc pentanoate was incorporated to 0, 50, 100 to neutralization, based on stoichiometry. Powders were prepared, electrostatically sprayed over Bonderite 1000 and baked for 20 minutes at 400° F. Results are in the following Table 12.

TABLE 12

| % Neut. | 0 | 50 | 100 |
|---|---|---|---|
| Pencil Hardness | 2B | HB | HB |
| MEK Rubs | 20 | 69 | >100 |
| Film Build (mils) | 1.75 | 1.70 | 1.75 |

EXAMPLE 12

Ten percent solutions of various salts were prepared in DMSO and added to acrylic polymer from Example A. Drawdowns were prepared over Bonderite 1000 and baked for 20 minutes at 400° F. MEK resistance is shown in the following Table 13.

TABLE 13

| Zinc Salt (100% Neut.) | MEK Rubs |
|---|---|
| Acrylic alone | 7 |
| Zinc propionate | 71 |
| Zinc salicylate | 55 |
| Zinc benzoate | 35 |
| Zinc acetate | 48 |

EXAMPLE 13

Paint was Tested Using Other Zinc Salts

Powder

Zinc acetate, propionate, and salicylate were evaluated using the acrylic polymer of Example 8 at 0, 50, and 100% W neutralization. Powders were electrostatically sprayed over Bonderite 1000 and baked for 20 minutes at 400° F. Results are shown in Table 14.

TABLE 14

Effect of Neutralization with Various Zinc Salts on Film Properties

| Coating | DFT (mils) | 60° Gloss (%) | (#2 × rubs) MEK Res. | DI Res. | 15 min. DI Boil | Pencil Hardness | Dir./Rev. Impact (in. lbs.) | Conical Mandrel |
|---|---|---|---|---|---|---|---|---|
| Unneut. control | 1.5 | 104.5 | 10 | >100 | sev. blister/ sev. blush | 2B | <10 | fail |
| 50% Neut. Zn Acet. | 2.0 | 76.9 | 33 | >100 | sl. cracks/ sl. blush | B | <10 | fail |
| 100% Neut. Zn Acet. | 1.7 | 47.7 | 78 | >100 | pass | B | <10 | fail |
| 50% Neut. Zn Prop. | 1.9 | 86.6 | 51 | >100 | sl. cracks/ sl. blush | B | <10 | fail |
| 100% Neut. Zn Prop. | 2.1 | 86.2 | 89 | >100 | pass | HB | <10 | fail |
| 50% Neut. Zn Salic. | 2.3 | 88.6 | 39 | >100 | sev. blister/ sev. blush | 2B | <10 | fail |
| 100% Neut. Zn Salic. | 2.1 | 75.9 | 51 | >100 | No gloss/ sev. blush | 2B | <10 | fail |

EXAMPLE 14

Formation of ionomeric interactions with the acrylic of Example 8 was also determined though the use of a isopropanol extraction technique as shown in Example 1(D) using different neutralizing salts. Results are shown in attached Table 15. Clearly thermosetting film properties are evident with the incorporation of zinc salts, by the limited solubility of zinc neutralized coatings.

TABLE 15

Isopropanol Extraction of Ionomer Films

| Sample | % Weight Loss | Sx |
|---|---|---|
| Unneut. control | 99.40 | 0.20 |
| Zn Acetate | | |
| 50% Neut. | 11.46 | 1.44 |
| 100% Neut. | 0.07 | 0.41 |
| Zn Propionate | | |
| 50% Neut. | 9.98 | 1.71 |
| 100 Neut. | 1.26 | 0.22 |
| Zn Salicylate | | |
| 50% Neut. | 14.92 | 0.05 |
| 100% Neut. | 5.32 | 0.78 |

The detailed description and examples illustrate the merits of this invention based on ionomeric coatings, but are not intended to be limiting except by the appended claims.

We claim:

1. In a process for producing a heat cured non-aqueous protective coating composition containing a reactive polymeric binder and applying the protective coating composition to a substrate, the process steps comprising:

producing a reactive polymeric binder system comprising a carboxyl functional polymer having an Acid No. between 10 and 200 and number average molecular weight between about 500 and 100,000 where the carboxyl functional polymer is selected from an acrylic polymer, a linear polyester polymer, a polyester-acrylic graft copolymer, and a polyurethane polymer where the carboxyl functional polymer is intermixed with an organic zinc salt having an acidified counterion with a pKa above about 4, where the ratio of said organic zinc salt to said carboxyl functional polymer is at a level such that the organic zinc salt neutralizes at least 10% of the equivalents of carboxyl functionality of the carboxyl functional polymer to form at least a partially zinc neutralized ionomer substantially free of ionic clustering between said organic zinc salt and said carboxyl functional polymer;

applying the coating composition as a coating film to the surface of a substrate;

heating the applied coating film to a heat curing temperature above about 120° C. to coreact the organic zinc salt with the carboxyl functional polymer, and the zinc cation clusters with the carboxyl functional polymer to form ionomeric links and a hardened applied coating film while the organic anion of the organic zinc salt is protonated and volatilized from the applied coating film.

2. The process in claim 1 where the applied coating is heat cured at temperatures between about 150° C. and 200° C.

* * * * *